US006974636B2

(12) United States Patent
Darolia et al.

(10) Patent No.: US 6,974,636 B2
(45) Date of Patent: Dec. 13, 2005

(54) PROTECTIVE COATING FOR TURBINE ENGINE COMPONENT

(75) Inventors: Ramgopal Darolia, West Chester, OH (US); Mark Daniel Gorman, West Chester, OH (US); Melvin Robert Jackson, Niskayuna, NY (US); Ji-Cheng Zhao, Latham, NY (US)

(73) Assignee: General Electric Company, Schenectady, NY (US)

( * ) Notice: Subject to any disclaimer, the term of this patent is extended or adjusted under 35 U.S.C. 154(b) by 165 days.

(21) Appl. No.: 10/668,087

(22) Filed: Sep. 22, 2003

(65) Prior Publication Data

US 2005/0064228 A1 Mar. 24, 2005

(51) Int. Cl.[7] .......................... B32B 15/04; C25D 7/00

(52) U.S. Cl. ..................... 428/632; 428/670; 428/678; 428/680; 428/546; 428/926; 428/935; 148/518; 205/109; 205/149; 205/170; 205/224; 205/227; 205/228; 205/238; 205/255; 205/257; 205/264; 205/265; 416/241; 416/223

(58) Field of Search ............................... 428/632, 670, 428/678, 680, 546, 926, 935; 148/518; 205/109, 205/149, 170, 224, 227, 228, 238, 255, 257, 205/264, 265; 416/241, 223

(56) References Cited

U.S. PATENT DOCUMENTS

| | | | | |
|---|---|---|---|---|
| 4,399,199 A * | 8/1983 | McGill et al. | 428/670 |
| 5,427,866 A | 6/1995 | Nagaraj et al. | |
| 5,538,796 A * | 7/1996 | Schaffer et al. | 428/469 |
| 5,645,893 A | 7/1997 | Rickerby et al. | |
| 5,824,205 A | 10/1998 | Foster | |
| 5,837,385 A | 11/1998 | Schaeffer et al. | |
| 5,897,966 A * | 4/1999 | Grossklaus et al. | 428/670 |
| 6,020,075 A | 2/2000 | Gupta et al. | |
| 6,413,584 B1 | 7/2002 | Wustman et al. | |
| 6,458,473 B1 | 10/2002 | Conner et al. | |
| 6,521,113 B2 | 2/2003 | Strangman et al. | |
| 6,582,534 B2 | 6/2003 | Jackson et al. | |
| 6,609,894 B2 | 8/2003 | Jackson et al. | |
| 6,656,605 B1 * | 12/2003 | Schaeffer et al. | 428/670 |
| 2001/0004475 A1 | 6/2001 | Allen et al. | |
| 2002/0119043 A1 | 8/2002 | Allen et al. | |
| 2002/0130047 A1 | 9/2002 | Allen et al. | |
| 2002/0197502 A1 | 12/2002 | Zhao et al. | |
| 2003/0118863 A1 | 6/2003 | Darolia et al. | |
| 2003/0148141 A1 | 8/2003 | Zhao et al. | |
| 2003/0186075 A1 | 10/2003 | Zhao et al. | |

OTHER PUBLICATIONS

U.S. Appl. No. 10/634,543, filed Aug. 5, 2003, Darolia et al.

* cited by examiner

*Primary Examiner*—Robert R. Koehler
(74) *Attorney, Agent, or Firm*—Donald E. Hasse; Hasse & Nesbitt LLC

(57) ABSTRACT

A turbine engine component comprising a substrate made of a nickel-base or cobalt-base superalloy and a protective coating overlying the substrate, the coating formed by electroplating at least two platinum group metals selected from the group consisting of platinum, palladium, rhodium, ruthenium and iridium. The protective coating is typically heat treated to increase homogeneity of the coating and adherence with the substrate. The component typically further comprises a ceramic thermal barrier coating overlying the protective coating. Also disclosed are methods for forming the protective coating on the turbine engine component by electroplating the platinum group metals.

30 Claims, 1 Drawing Sheet

PROTECTIVE COATING FOR TURBINE ENGINE COMPONENT

BACKGROUND OF THE INVENTION

The present invention relates to forming protective coatings on turbine engine components that are exposed to high temperature, oxidation and corrosive environments. More particularly, the invention is directed to forming a protective coating useful as an environmental coating or a bond coat for a thermal barrier coating on turbine engine components, by depositing at least two platinum group metals on the substrate using an electroplating process.

In an aircraft gas turbine engine, air is drawn into the front of the engine, compressed by a shaft-mounted compressor, and mixed with fuel. The mixture is burned, and the hot exhaust gases are passed through a turbine mounted on a shaft. The flow of gas turns the turbine, which turns the shaft and provides power to the compressor. The hot exhaust gases flow from the back of the engine, driving it and the aircraft forwardly.

The hotter the exhaust gases, the more efficient are the operation of the jet engine. There is thus an incentive to raise the exhaust gas temperature. However, the materials used to fabricate the turbine vanes and blades normally limit the maximum temperature of the exhaust gases. In current engines, the turbine vanes and blades are made of nickel-based superalloys that can operate at temperatures of up to about 1150° C.

Many approaches have been used to increase the operating temperature limit of turbine blades and vanes. The composition and processing of the materials used to form the blades and vanes have been improved. Physical cooling techniques have also been used, such as forcing air through internal cooling channels of the components during engine operation.

In another approach, an environmental coating or a thermal barrier coating system is applied to turbine blades or vanes. The thermal barrier coating system includes a ceramic thermal barrier coating that insulates the component from the hot exhaust gas, permitting the exhaust gas to be hotter than would otherwise be possible with the particular material and fabrication process of the component. Ceramic thermal barrier coatings usually do not adhere well directly to the superalloy substrates. Therefore, an additional metallic layer called a bond coat is placed between the substrate and the thermal barrier coating. The bond coat is usually made of an aluminum-containing overlay alloy, such as a NiCrAlY or a NiCoCrAlY, or of a diffusion nickel aluminide or platinum aluminide material.

While superalloy components coated with a thermal barrier coating system provide substantially improved performance over uncoated components, there remains room for further improvement in resistance to oxidation and hot corrosion damage. In addition, the alloying elements of conventional environmental coatings and bond coats can interdiffuse with the substrate alloy and produce brittle intermetallic phases. Thus, there is an ongoing need for protective coatings for turbine engine components that have improved environmental resistance and long-term stability when used as an environmental coating or as a bond coat for a thermal barrier coating system.

BRIEF DESCRIPTION OF THE INVENTION

In one aspect, the invention relates to a turbine engine component comprising:

a) a substrate made of a nickel-base or cobalt-base superalloy; and b) a protective coating overlying the substrate, the protective coating formed by depositing at least two platinum group metals selected from the group consisting of platinum, palladium, rhodium, ruthenium and iridium using an electroplating process.

In another aspect, this invention relates to a turbine engine component comprising:

a) a substrate made of a nickel-base or cobalt-base superalloy;

b) a protective coating overlying the substrate, the protective coating formed by depositing at least two platinum group metals selected from the group consisting of platinum, palladium, rhodium, ruthenium and iridium using an electroplating process; and c) a ceramic thermal barrier coating overlying the protective coating.

Another aspect of the invention relates to a method for forming a protective coating on a turbine engine component, the method comprising:

a) providing a substrate made of a nickel-base or cobalt-base superalloy; and b) depositing a protective coating on the substrate by electroplating at least two platinum group metals selected from the group consisting of platinum, palladium, rhodium, ruthenium and iridium.

The invention also relates to a method for forming a protective coating on a turbine engine component, the method comprising:

a) providing a substrate made of a nickel-base or cobalt-base superalloy;

b) depositing a protective coating on the substrate by electroplating at least two platinum group metals selected from the group consisting of platinum, palladium, rhodium, ruthenium and iridium;

c) heat treating the protective coating and the substrate at a temperature of from about 900° C. to about 1200° C. for from about 1 to about 8 hours; and d) forming a ceramic thermal barrier coating over the protective coating.

DETAILED DESCRIPTION OF THE INVENTION

The present invention relates to forming a protective overlay coating on articles used in hostile thermal environments, such as turbine, combustor and augmentor components of a gas turbine engine. The overlay coating can be used as an environmental coating or a bond coat for a ceramic thermal barrier coating deposited on the overlay coating. The thermal barrier coating system formed provides improved resistance to oxidation, spallation, and hot corrosion as compared to conventional bond coats such as aluminide diffusion coatings and MCrAlY coatings. Additionally, conventional bond coats and environmental coatings often have high levels of aluminum that can diffuse into the base metal and create a secondary reaction zone that reduces the mechanical strength of the component. This is avoided in the present invention by forming protective coatings comprising relatively inert platinum group metals. These coatings have low oxidation rates, and are sometimes referred to as inert coatings. The resulting coatings also have high strength and durability, and a good thermal expansion match with ceramic thermal barrier coatings used on turbine engine components. The protective coatings herein thus typically replace conventional environmental coatings and bond coats used on turbine engine components. The invention thus provides an improved turbine engine component that is protected against high temperatures and adverse environmental effects by the protective coating herein, and optionally further protected by an additional ceramic thermal barrier coating.

Other features and advantages of the invention will be apparent from the following more detailed description, taken in conjunction with the accompanying drawings which illustrate, by way of example, the principles of the invention.

Figure 1:
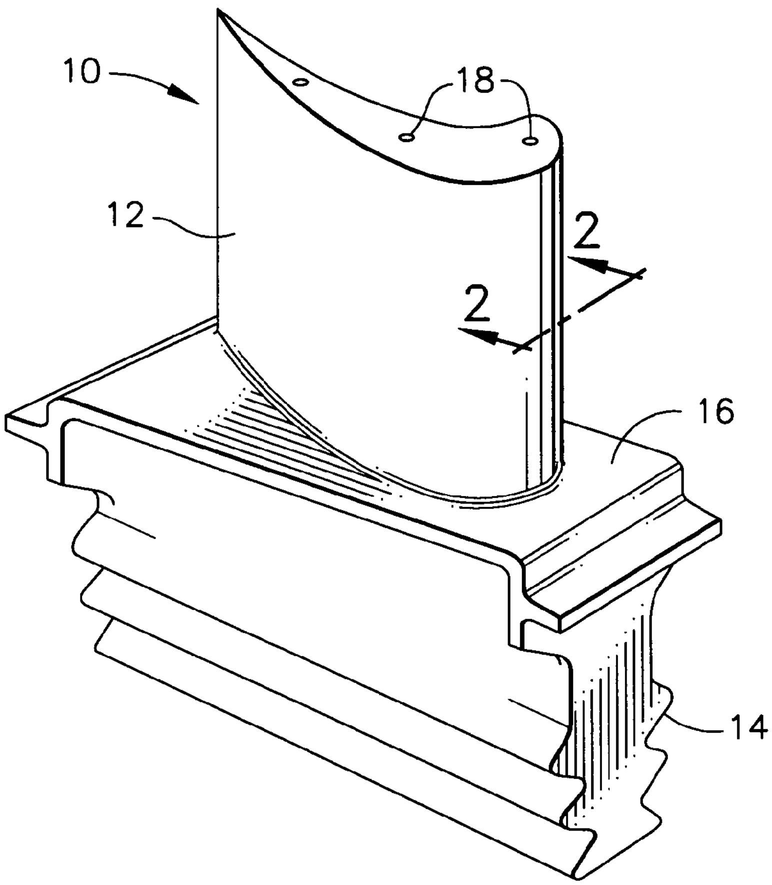
FIG. 1 is a perspective view of a gas turbine engine component.

The present invention is generally applicable to turbine engine components that operate within environments characterized by relatively high temperatures, severe thermal stresses and thermal cycling. Such components include the high and low-pressure turbine nozzles and blades, shrouds, combustor liners and augmentor hardware of gas turbine engines. One such example is the high-pressure turbine blade 10 shown in FIG. 1. The blade 10 generally includes an airfoil 12 against which hot combustion gases are directed during operation of the gas turbine engine, and whose surface is therefore subjected to severe attack by oxidation, corrosion and erosion. The airfoil 12 is anchored to a turbine disk (not shown) with a dovetail 14 formed on a root section 16 of the blade 10. Cooling holes 18 are present in the airfoil 12 through which bleed air is forced to transfer heat from the blade 10. While the advantages of this invention will be described with reference to the high pressure turbine blade 10 shown in FIG. 1, and particularly nickel-base superalloy blades of the type shown in FIG. 1, the teachings of this invention are generally applicable to any turbine engine component on which a coating system may be used to protect the component from its environment.

Figure 2:
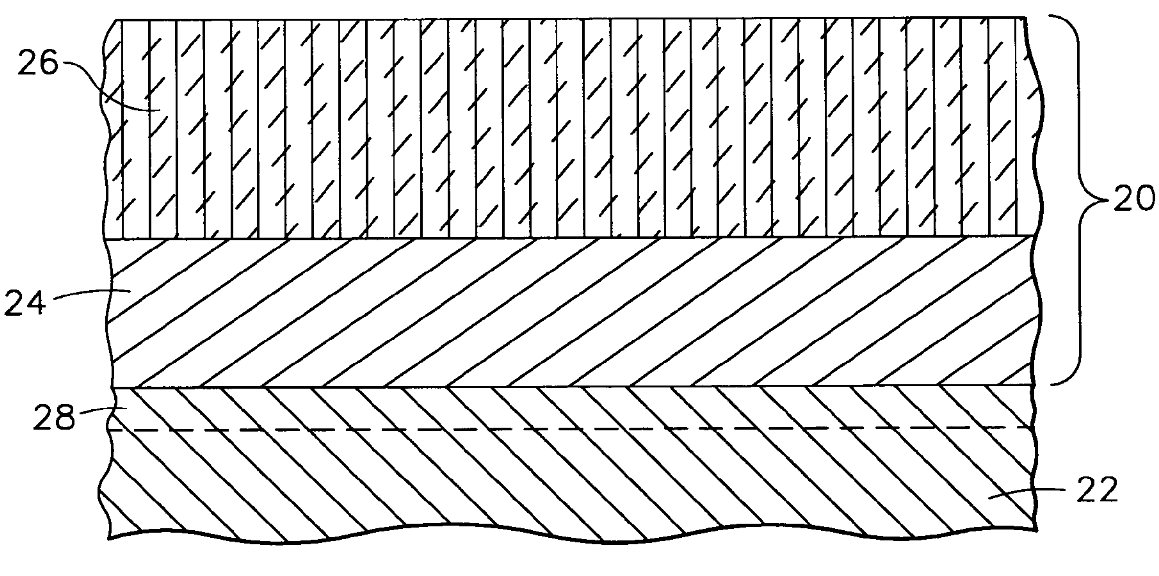
FIG. 2 is a sectional view through the component of FIG. 1 along line 2—2, showing one embodiment of the invention.

FIG. 2 shows a thermal barrier coating system 20 of a type that benefits from the teachings of this invention. Coating system 20 includes a ceramic layer 26 bonded to the blade substrate 22 with a protective coating 24, which serves as a bond coat to the ceramic layer 26. The substrate 22 is typically a high-temperature material, such as an iron, nickel or cobalt-base superalloy.

Protective coating 24 comprises at least two platinum group metals selected from the group consisting of platinum, palladium, rhodium, ruthenium, and iridium that are deposited on the substrate 22 by an electroplating process. In one embodiment, the coating 24 comprises at least three of the above platinum group metals. In most applications, coating 24 comprises at least about 40%, and typically at least about 50%, by weight, of platinum or rhodium, or mixtures thereof. The particular platinum group metals used, their relative proportions, and the thickness of the coating can be selected to obtain the desired properties, such as strength, oxidation resistance, durability, hardness, thermal expansion, and elastic modulus for the coating application at hand. Minor amounts of additional elements, such as aluminum, zirconium, hafnium and chromium, and mixtures thereof, can be added to improve the mechanical and/or physical properties of the coating 24. Such elements can be added at levels up to about 25%, typically up to about 20%, by weight of the coating. Coating 24 typically has a thickness of from about 10 to about 120 microns, more typically from about 10 to about 60 microns. When the above metals are deposited sequentially as individual layers on the substrate, the thickness of each layer of metal in the protective coating 24 is usually from about 5 to about 50 microns, more typically from about 5 to about 25 microns.

Prior to depositing the protective coating 24, the surface of the turbine engine component may be cleaned or conditioned, for example, by using a caustic solution or grit blasting operation, immersing the component in a heated liquid solution comprising a weak acid, and/or agitating the surface of the component while it remains immersed in the solution. In this manner, any dirt or corrosion products on the surface can be removed without damaging the component.

The protective coating 24, and each of its layers, may be deposited by any suitable electroplating process, including the various electroplating and entrapment plating processes known in the art. Electroplating processes have relatively high deposition efficiencies that make them particularly useful for depositing the expensive platinum group metals herein. The platinum group metals may be deposited sequentially; two or more metals may be co-plated; the metals may be deposited using entrapment plating; or any combination of these processes may be used. Electroplating of individual layers is typically used, however, to more easily the control bath chemistry and process parameters. For example, a platinum layer may be deposited by placing a platinum-comprising solution into a deposition tank and depositing platinum from the solution onto the component in an electroplating process. An operable platinum-comprising aqueous solution is $Pt(NH_3)_4HPO_4$ having a concentration of about 4–20 grams per liter of platinum. The voltage/current source can be operated at about 0.5–20 amperes per square foot (about 0.05–0.93 amperes per square meter) of facing article surface. The platinum layer can be deposited in from about 1 hour to about 4 hours at a temperature of about 190–200° F. (about 88–93° C.). Other platinum source chemicals and plating parameters known in the art may also be used. Similar processes can be used to deposit palladium, rhodium, ruthenium and iridium, and combinations thereof.

In one embodiment, an entrapment plating process is used to deposit the platinum group metals herein. In this process, standard electroplating is conducted with a fine dispersion of solid particulate material suspended in the plating solution. Some of the particles become entrapped and retained in the plated coating. A diffusion treatment can then be used to obtain a substantially uniform composition of the coating. The ratio of plated to entrapped material and the composition of each material is controlled to arrive at the desired overall coating composition. For example, platinum plating can be used to trap rhodium-palladium particulates and obtain a Pt—Rh—Pd coating. An entrapment plating process is particularly useful for adding minor amounts (e.g., up to about 25%, typically up to about 20%, by weight) of non-platinum group metals such as aluminum, zirconium, hafnium and chromium, and mixtures thereof.

After depositing the protective coating 24, or each layer thereof, the article is often heat treated, typically at about 900° C. to about 1200° C., more typically from about 1000° C. to about 1100° C., for a period of time, e.g., up to about 24 hours, but generally from about 1 to about 8 hours, typically from about 2 to about 4 hours. This causes the metals of the protective coating to interdiffuse, increasing the homogeneity of the coating. Heat treating also improves the adherence or bond between the coating and the substrate.

The platinum, palladium, rhodium, ruthenium and/or iridium atoms of the protective coating 24 interdiffuse with the substrate 22 in a diffusion region 28. The heat treatment may be conducted after deposition of single or multiple layers of the platinum group metals, or after electroplating is complete, to enhance microstructure and composition uniformity, improve adherence of the protective coating 24, and reduce residual stresses within the coating and the diffusion region 28. The diffusion region 28 usually has a thickness of from about 1 to about 20 microns, typically from about 2 to about 15 microns. However, the interdiffusion of atoms continues during service, and therefore the thickness of region 28 will continually increase during service. If desired, a diffusion barrier layer such as disclosed in U.S. patent application 20020197502, Zhao and Jackson, published Dec. 26, 2002, may be employed to minimize diffusion between the protective coating 24 and the substrate 22. In one embodiment, the diffusion barrier is a thin layer (e.g., from about 0.05 to about 5 microns thick) of aluminum oxide, which may be deposited on the substrate by processes such as thermal spray, sol gel, laser deposition, physical vapor deposition, or chemical vapor deposition, or which may be formed as a thermally grown oxide. For example, an aluminum oxide layer about 1 micron thick may be formed by oxidizing the surface of an aluminum rich superalloy or a superalloy that has had its surface enriched in aluminum to promote the formation of aluminum oxide. The oxidation step may be performed by heating the substrate to a temperature in the range of from about 1090° C. to about 1150° C. for about one hour in air or in a controlled atmosphere, especially with a partial pressure of oxygen.

A ceramic layer 26 may then be deposited on the protective coating 24. Ceramic layer 26 is formed of a ceramic material that serves to insulate the substrate 22 from the temperature of the hot exhaust gas passing over the surface of the airfoil 12 when the engine is in service. The ceramic layer 26 may be any acceptable material, but typically is yttria-stabilized zirconia (YSZ) having a composition of from about 3 to about 20 weight percent yttrium oxide (e.g., about 7 percent yttrium oxide), with the balance zirconium oxide. Other materials can also be used, such as yttria, nonstabilized zirconia, or zirconia stabilized by ceria ($CeO_2$), scandia ($Sc_2O_3$), or other oxides. The ceramic layer 26 usually has a thickness of from about 50 to about 1000 microns, typically about 75 to about 400 microns. The ceramic layer 26 is typically applied by air plasma spray, low-pressure plasma spray or physical vapor deposition techniques. To attain a strain-tolerant columnar grain structure, the ceramic layer 26 is usually deposited by physical vapor deposition (PVD), though other deposition techniques can be used. In contrast with conventional environmental coatings and bond coats, the surface of the protective coating 24 typically does not oxidize to any significant degree to form an oxide surface layer. However, since ceramic thermal barrier coatings are sufficiently permeable to gas that oxygen from the operating environment may diffuse through such a coating and react with non-platinum group metals in the bond coat, a small amount of oxide may be formed. Any such oxide layer formed adheres well to the protective coating and chemically bonds with the ceramic layer 26 so that satisfactory performance of a thermal barrier coating system is provided.

The following example is intended to illustrate aspects of the invention, and should not be taken as limiting the invention in any respect.

EXAMPLE

Layers of platinum (about 76.2 microns thick), rhodium (about 12.7 microns thick), and palladium (about 12.7 microns thick) are sequentially deposited by electroplating onto button specimens of a nickel-base superalloy known as René N5 having a nominal composition, in weight percent, of 7.5% Co, 7.0% Cr, 6.2% Al, 6.5% Ta, 5.0% W, 3.0% Re, 1.5% Mo, 0.15% Hf, 0.05% C, 0.004% B, 0.01% Y, with the balance nickel and incidental impurities. The samples are then heat treated at a temperature of about 1050° C. for 2 hours to interdiffuse the layers with the substrate. All samples are then coated with a ceramic layer (about 125 microns thick) of zirconia with about 7% yttria by electron beam physical vapor deposition. The thermal barrier coating system formed comprises the ceramic layer and the protective coating comprising platinum, rhodium and palladium.

The samples are tested by a thermal cycling procedure to determine the durability of the ceramic layer of the thermal barrier coating system. In the procedure, the samples are heated to a temperature of 1165° C. in a time of about 9 minutes, held at temperature for 45 minutes, and then cooled to below about 95° C. within 10 minutes (this constitutes one cycle). Failure is defined as the number of cycles required for more than 10 percent of the ceramic layer to be lost by spalling. In this testing, the ceramic layer more than twice as long as a similar ceramic layer specimens comprising a conventional platinum-aluminide bond coat instead of the platinum-rhodium-palladium bond coat of the invention.

Similar results are obtained when layers of platinum (about 76.2 microns thick) and palladium (about 25.4 microns thick) are sequentially deposited by electroplating onto the button specimens to form a platinum-palladium bond coat, and when layers of platinum (about 76.2 microns thick) and rhodium (about 25.4 microns thick) are sequentially deposited by electroplating onto the button specimens to form a platinum-rhodium bond coat, instead of the above platinum-rhodium-palladium bond coat.

Various embodiments of this invention have been described. However, this disclosure should not be deemed to be a limitation on the scope of the invention. Accordingly, various modifications, adaptations, and alternatives may occur to one skilled in the art without departing from the spirit and scope of the claimed invention.

What is claimed is:

1. A turbine engine component comprising:

a) a substrate made of a nickel-base or cobalt-base superalloy; and b) a protective coating overlying the substrate, the protective coating formed by depositing at least two platinum group metals selected from the group consisting of platinum, palladium, rhodium, ruthenium and iridium using an electroplating process, wherein the platinum group metals are sequentially deposited, co-deposited using an electroplating step, or deposited using entrapment plating, or combinations thereof.

2. The component of claim 1 wherein the protective coating is at least partially interdiffused with the substrate.

3. The component of claim 1 wherein the protective coating has a thickness of from about 10 to about 120 microns.

4. The component of claim 3 wherein the protective coating has a thickness of from about 10 to about 60 microns.

5. The component of claim 4 wherein the protective coating comprises at least three metals selected from the group consisting of platinum, palladium, rhodium, ruthenium, and iridium.

6. The component of claim 5 wherein the protective coating comprises at least about 50% by weight of platinum or rhodium, or mixtures thereof.

7. The component of claim 1 that is a turbine blade.

8. A turbine engine component comprising:

a) a substrate made of a nickel-base or cobalt-base superalloy;

b) a protective coating overlying the substrate, the protective coating formed by depositing at least two platinum group metals selected from the group consisting of platinum, palladium, rhodium, ruthenium and iridium using an electroplating process; and c) a ceramic thermal barrier coating overlying the protective coating.

9. The component of claim 8 wherein the protective coating is at least partially interdiffused with the substrate.

10. The component of claim 9 wherein the protective coating has a thickness of from about 10 to about 120 microns.

11. The component of claim 10 wherein the protective coating has a thickness of from about 10 to about 60 microns.

12. The component of claim 10 wherein the protective coating comprises at least about 50% by weight of platinum or rhodium, or mixtures thereof.

13. The component of claim 12 wherein the protective coating comprises at least three metals selected from the group consisting of platinum, palladium, rhodium, ruthenium and iridium.

14. A method for forming a protective coating on a turbine engine component, the method comprising:

a) providing a substrate made of a nickel-base or cobalt-base superalloy; and b) depositing a protective coating on the substrate by electroplating at least two platinum group metals selected from the group consisting of platinum, palladium, rhodium, ruthenium and iridium, wherein the platinum group metals are sequentially deposited, co-deposited using an electroplating step, or deposited using entrapment plating, or combinations thereof.

15. The method of claim 14 wherein the protective coating is heat treated at a temperature of from about 900° C. to about 1200° C. for from about 1 to about 8 hours.

16. The method of claim 14 wherein the protective coating has a thickness of from about 10 to about 120 microns.

17. The method of claim 16 wherein the protective coating has a thickness of from about 10 to about 60 microns.

18. The method of claim 16 wherein the protective coating comprises at least about 50% by weight of platinum or rhodium, or mixtures thereof.

19. The method of claim 18 wherein the protective coating comprises at least three metals selected from the group consisting of platinum, palladium, rhodium, ruthenium, and iridium.

20. The method of claim 14 wherein the platinum group metals are sequentially deposited.

21. The method of claim 14 wherein at least two of the platinum group metals are co-deposited using an electroplating step.

22. The method of claim 14 wherein the platinum group metals are deposited using entrapment plating.

23. The method of claim 22 wherein the protective coating comprises up to about 25% by weight of aluminum, zirconium, hafnium, or chromium, or mixtures thereof, deposited using entrapment plating.

24. The method of claim 19 wherein the platinum group metals are sequentially deposited.

25. The method of claim 24 wherein the protective coating is heat treated at a temperature of from about 900° C. to about 1200° C. for from about 1 to about 8 hours.

26. A method for forming a protective coating on a turbine engine component, the method comprising:

a) providing a substrate made of a nickel-base or cobalt-base superalloy;

b) depositing a protective coating on the substrate by electroplating at least two platinum group metals selected from the group consisting of platinum, palladium, rhodium, ruthenium and iridium;

c) heat treating the protective coating and the substrate at a temperature of from about 900° C. to about 1200° C. for from about 1 to about 8 hours; and d) forming a ceramic thermal barrier coating over the protective coating.

27. The method of claim 26 wherein the platinum group metals are sequentially deposited.

28. The method of claim 26 wherein the protective coating has a thickness of from about 10 to about 60 microns.

29. The method of claim 26 wherein the protective coating comprises at least three metals selected from the group consisting of platinum, palladium, rhodium, ruthenium and iridium.

30. The method of claim 26 wherein the protective coating comprises at least about 50% by weight of platinum or rhodium, or mixtures thereof.

* * * * *